US006044261A

United States Patent [19]
Kazmi

[11] Patent Number: 6,044,261
[45] Date of Patent: Mar. 28, 2000

[54] MULTIPLE HOME ZONE AREAS WITHIN A MOBILE TELECOMMUNICATIONS NETWORK

[75] Inventor: Mustafa A. Kazmi, Irving, Tex.

[73] Assignee: Ericsson, Inc., Research Triangle Park, N.C.

[21] Appl. No.: 08/822,243

[22] Filed: Mar. 19, 1997

[51] Int. Cl.[7] .................................................. H04M 15/00

[52] U.S. Cl. ............................................ 455/408; 455/445

[58] Field of Search .................................... 455/406, 407, 455/405, 408, 422, 456, 432, 445, 457, 433

[56] References Cited

U.S. PATENT DOCUMENTS

| | | | |
|---|---|---|---|
| 3,764,747 | 10/1973 | Nakajima et al. | 455/407 |
| 4,640,986 | 2/1987 | Yotsutani et al. | 379/60 |
| 4,782,508 | 11/1988 | Borchering et al. | 379/67 |
| 5,101,500 | 3/1992 | Marui | 455/32.1 |
| 5,235,633 | 8/1993 | Dennison et al. | 455/456 |
| 5,295,180 | 3/1994 | Vendetti et al. | 379/59 |
| 5,303,297 | 4/1994 | Hillis | 455/406 |
| 5,327,144 | 7/1994 | Stilp et al. | 342/387 |
| 5,361,297 | 11/1994 | Ortiz et al. | 379/130 |
| 5,444,765 | 8/1995 | Marui et al. | 379/59 |
| 5,473,671 | 12/1995 | Partridge, III | 379/59 |
| 5,488,655 | 1/1996 | Hamlen | 379/114 |
| 5,568,153 | 10/1996 | Béliveau | 342/357 |
| 5,577,100 | 11/1996 | McGregor et al. | 379/58 |
| 5,600,706 | 2/1997 | Dunn et al. | 455/456 |
| 5,613,213 | 3/1997 | Naddell et al. | 455/414 |
| 5,659,601 | 8/1997 | Cheslog | 455/406 |
| 5,754,955 | 5/1998 | Ekbatani | 455/422 |
| 5,794,140 | 8/1998 | Sawyer | 455/408 |
| 5,802,468 | 9/1998 | Gallant et al. | 455/422 |
| 5,815,814 | 9/1998 | Dennison et al. | 455/456 |

FOREIGN PATENT DOCUMENTS

| | | |
|---|---|---|
| 0 568 824 A2 | 4/1993 | European Pat. Off. . |
| 0 597 638 A1 | 11/1995 | European Pat. Off. . |
| WO 94/28670 | 12/1994 | WIPO . |
| WO 96/20570 | 7/1996 | WIPO . |
| WO 97/13387 | 4/1997 | WIPO . |

*Primary Examiner*—Reinhard J. Eisenzopf
*Assistant Examiner*—Charles N. Appiah
*Attorney, Agent, or Firm*—Jenkens & Gilchrist, P.C.

[57] ABSTRACT

A register correlating a number of different home zones with a particular subscription is associated with a home location register (HLR). A different geographic location, effective time period, and corresponding charging rate can be associated with each home zone. In response to a request to establish a call connection with a particular mobile station traveling within its coverage area, the serving mobile switching center (MSC) communicates with the associated HLR to determine which home zone is currently effective for the relevant mobile station. The serving MSC then determines whether the mobile station is currently located within the determined home zone. In response to an affirmative determination, a corresponding reduced charging rate is applied towards the resulting call connection.

23 Claims, 8 Drawing Sheets

| START TIME | END TIME | HZ ID |
|---|---|---|
| MON 0801 | MON 1700 | 0 |
| MON 1701 | TUES 0800 | 1 |
| TUES 0801 | TUES 1700 | 2 |
| FRI 1700 | SUN 2400 | 3 |
| | | |
| DEFAULT | | 3 |

210

220

230

MULTIPLE HOME ZONE AREAS WITHIN A MOBILE TELECOMMUNICATIONS NETWORK

BACKGROUND OF THE INVENTION

1. Technical Field of the Invention

The present invention relates to a mobile telecommunications network and, in particular, to the provision of multiple home zones and variable charging rates toward associated mobile subscribers.

2. Description of Related Art

With the introduction of the Global Standard for Mobile (GSM) communication and the Personal Communications System (PCS), the concepts of wireline telephone service and wireless telephone service have changed drastically. Instead of assigning a telephone number for a particular geographic location or a particular telecommunications terminal, in accordance with the GSM or PCS, a telephone number may be instead assigned towards a particular subscriber or subscription. As a result, each subscriber is associated with a Subscriber Identity Module (SIM) card. Using the SIM card, a mobile subscriber is able to store necessary mobile subscriber information in a detachable memory unit and freely associate the card with any available mobile station (also referred to as a mobile terminal, and mobile equipment, and hereinafter collectively referred to as a "mobile station") By inserting a mobile subscriber's SIM card into a mobile station, the stored subscriber information in the inserted SIM card is available to the mobile subscriber's new terminal. As a result, the mobile subscriber is able to freely utilize any available mobile station while maintaining the same directory number and subscriber feature data.

Furthermore, in order to enable the mobile subscriber to utilize the mobile station in a manner similar to a cordless phone for charging purposes, the concept of a "home zone" has been introduced. If the mobile subscriber makes a call within his home zone, the mobile subscriber is not charged for the air time, or is charged at a significantly lower air time rate. Accordingly, within the home zone, such as the subscriber's home or office, the mobile subscriber can still utilize the associated mobile station to originate outgoing calls and to receive incoming calls without incurring expensive air time charges and without physically using a different telephone terminal, e.g., wireline terminal.

With a conventional cordless terminal, the radio frequency communications range with the serving base unit is rather limited. Consequently, a subscriber is not able to travel out of the immediate vicinity of the base unit and utilize the cordless terminal. However, with a PCS or GSM based telecommunications network, home zone service is still provided by the same mobile switching center (MSC) serving that particular geographic location. Therefore, with the conventional cordless system, it was a physical limitation that imposed the geographic boundaries of the service area. In contrast, within the GSM or PCS network, it is a logical limitation that imposes the geographic boundaries of the mobile subscriber's home zone. Accordingly, the home zone associated with a particular mobile subscriber can be much larger than what was previously available with the conventional cordless system. This logical limitation may include only a few blocks from his home, or a radius of half kilometer, for example, covering a certain location. Once the mobile subscriber travels outside of the associated home zone, regular air time billing resumes.

For a typical mobile subscriber, it would be desirable to be able to associate or designate a number of different home zones and select one of those home zones as being in effect at a given time as the mobile subscriber moves from one geographic location to another geographic location. As an example, during business hours, a first geographic area, such as the place of work, would be designated as the home zone. On the other hand, after work, a second geographic area, such as home, would be designated as the home zone. Such variations in the size and location of the home zone may further differ for different times of the day or days of the week.

With a conventional wireless system, however, only one home zone can be assigned and associated with a mobile subscriber or subscription. Accordingly, if the mobile subscriber needs to change his home zone designation, he needs to inconveniently notify the service operator and designate a new area as his home zone. If the subscriber changes from one geographic area to another geographic area with a regular schedule, such changes further have to be made repeatedly in accordance with his schedule.

Accordingly, there is a need for a mechanism to enable a serving mobile telecommunications network to provide variable home zones for a particular mobile subscriber.

SUMMARY OF THE INVENTION

The present invention discloses a method and apparatus for determining a charging rate for a call connection within a mobile telecommunications network. A plurality of reduced charging areas (i.e., home zones) each assigned with a different geographic coverage area are associated with a particular mobile subscription. In response to an indication to establish a call connection, a mobile switching center (MSC) currently serving the mobile station determines which one of the reduced charging areas is currently effective. The serving MSC then further determines whether the mobile station is currently located within the determined effective reduced charging area. In response to an affirmative determination, a charging rate associated with the determined effective reduced charging area is applied towards the subscription for the call connection.

In one embodiment of the present invention, the serving MSC requests and receives data representing the effective reduced charging area from a home location register (HLR) associated with the subscription.

In another embodiment of the present invention, the HLR periodically communicates or down-loads data representing the effective reduced charging area to the serving MSC as the reduced charging area changes with time.

BRIEF DESCRIPTION OF THE DRAWINGS

A more complete understanding of the method and apparatus of the present invention may be had by reference to the following detailed description when taken in conjunction with the accompanying drawings wherein:

FIG. 7 is a data structure diagram illustrating the association of multiple home zones with a particular mobile subscriber.

DETAILED DESCRIPTION OF THE DRAWINGS

Figure 1:
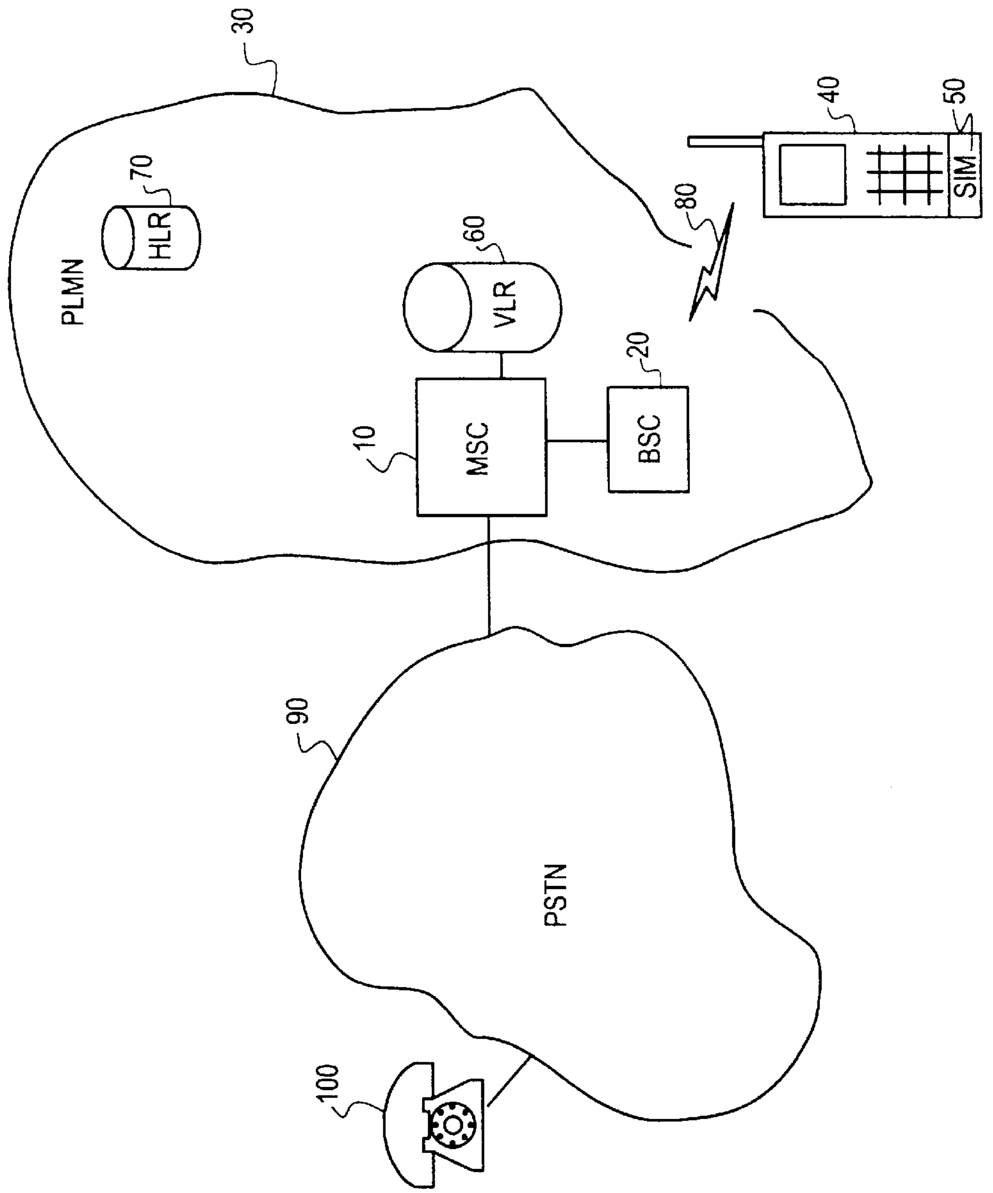
FIG. 1 is a block diagram of a telecommunications network illustrating a call connection with a mobile station.

FIG. 1 is a block diagram of a Public Land Mobile Network (PLMN) 30 including a mobile switching center (MSC) 10 and a base station controller (BSC) 20 providing mobile service to a mobile station 40. Attached to the mobile station 40 is a subscriber identity module (SIM) card 50 storing subscriber specific information. Such information includes a Mobile Station Integrated Service Digital Network (MSISDN) number identifying the mobile subscriber and other subscriber related data. In accordance with the Global Standard for Mobile (GSM) or the Personal Communications System (PCS) standard, by inserting a mobile subscriber's SIM card into a mobile station, the stored subscriber information in the inserted SIM card 50 is made available to the mobile subscriber's new terminal. As a result, the mobile subscriber is able to freely utilize any available mobile station while maintaining the same MSISDN number and subscriber feature data.

Whenever the mobile station 40 associated with the SIM card 50 travels into a particular mobile switching center (MSC) coverage area, a visitor location register (VLR) 60 associated with the serving MSC 10 copies into its memory the relevant subscriber information from a home location register (HLR) 70 associated with that particular mobile subscriber. Whenever the mobile station 40 originates an outgoing call, the radio signal 80 requesting an outgoing call setup is received by the base station controller (BSC) 20 connected to the serving MSC 10. The received request is then forwarded to the serving MSC 10, which in turn, processes the call setup request with the help of the subscriber information stored in the VLR 60. If the outgoing call connection is towards a wireline terminal 100, a call setup signal, such as an Initial Address Message (IAM) signal, is then transmitted from the serving MSC 10 to the connected Public Switched Telephone Network (PSTN) 90 to establish the call connection.

Whenever the mobile station 40 utilizes mobile service, there are basically two different types of charges that are incurred for resulting call connections. First, the mobile subscriber using the mobile station 40 is charged with the actual circuit connection between the serving MSC 10 and a connecting party. For example, if a call to a called party number, such as the wireline terminal 100, constitutes a long distance call, appropriate long distances charges will be levied against the mobile subscriber's subscription for the call connection between the serving MSC 10 and the wireline terminal 100. Second, the mobile subscriber is further charged for utilizing channel resources required for establishing and maintaining radio connection 80 between the mobile station 40 and the serving MSC 10 via the BSC 20. These charges are often referred to as air-time charges. Mobile subscribers are therefore levied with dual charges for each call connection. On the other hand, for a wireline terminal, only the first type of call connection charges are incurred by the subscriber. As a result, in order to avoid incurring the above dual charges, most subscribers avoid using a mobile station if a wireline terminal is readily available.

Figure 2:
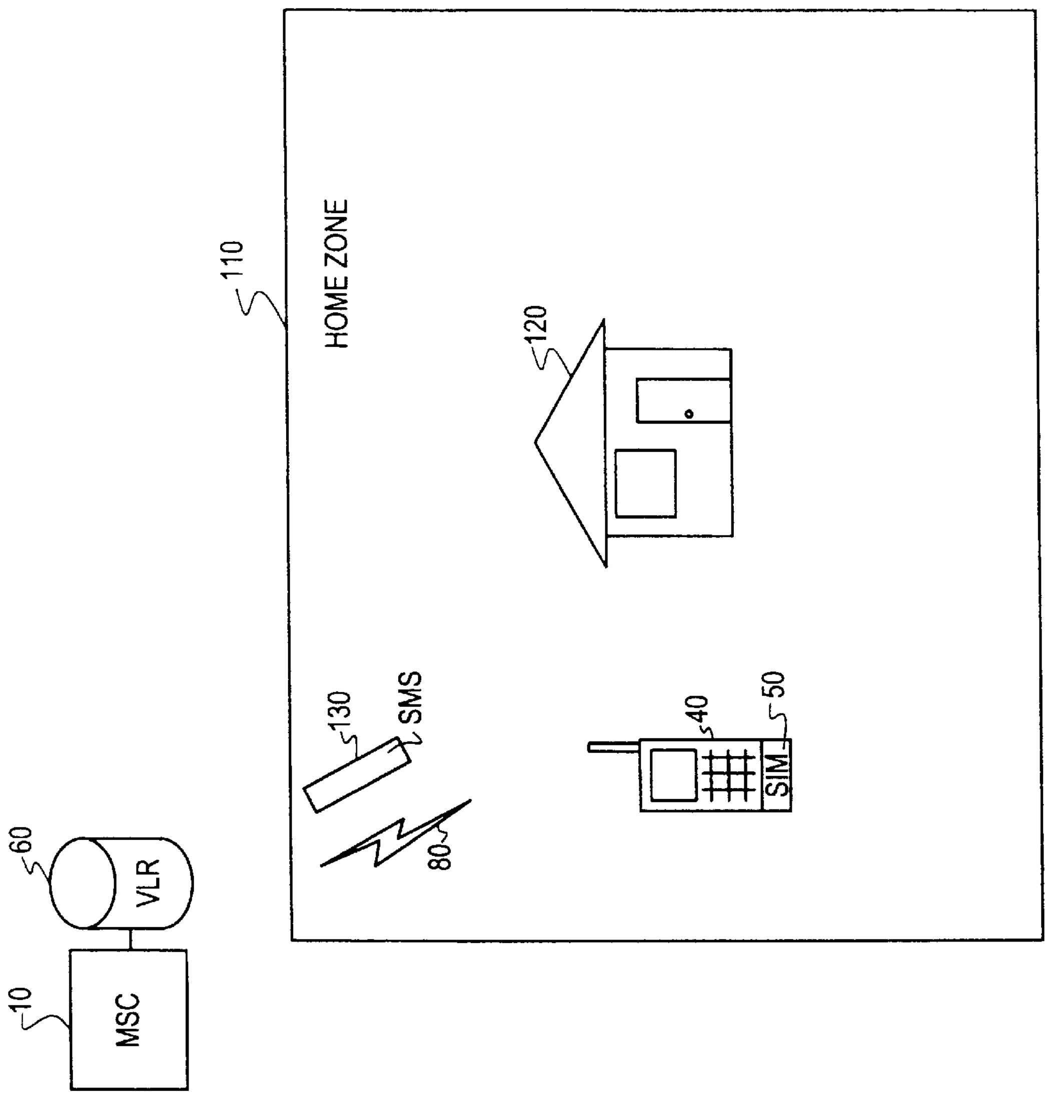
FIG. 2 is a block diagram illustrating a mobile station originating an outgoing call while traveling within a home zone associated with that particular mobile subscriber.

In order to eliminate such charging distinctions between a PLMN terminal (e.g., mobile station) and a PSTN terminal (wireline terminal), the concept of a "home zone" has been introduced. Reference is now made to FIG. 2 where a block diagram is shown illustrating the mobile station 40 originating an outgoing call while traveling within a home zone 110 associated with that particular mobile subscriber. A register, such as the SIM card 50, stores information representing the mobile subscriber's designated home zone. Such information can also be stored within the network and transmitted to the mobile station during a location update. Periodically, the mobile station 40 receives a location data 130 over one of the control channels indicating in which zone the mobile station is currently located. Such a location data transmission may utilize a Short Message Service (SMS) Cell Broadcast (CB) signal. The cell identification data may also be communicated over a Broadcast Control Channel (BCCH). It can also be communicated using a Short Message Service or Unstructured Supplementary Service Data (USSD) message over a Stand Alone Dedicated Control Channel (SDCCH). The mobile station compares the zone information received over the control channel with the stored home zone information in the SIM card 50. If there is a match, the mobile station determines that it is within the mobile subscriber's home zone and displays a message accordingly informing the mobile subscriber.

For all calls 80 originated from or terminated to the mobile station 40 while traveling within the home zone, the air time charges can be free or charged at a significantly lower rate than normal. As an illustration, the mobile subscriber can make an agreement with the mobile service provider to designate a few blocks around his house 120 as his home zone 110. After making such an agreement, the mobile subscriber utilizes his mobile station 40 more as a conventional cordless phone for charging purposes. The mobile subscriber still has to pay for the PSTN connection charges, but the radio connection charges to the serving MSC 10 are either free or charged at a significantly lower rate. Once the mobile station 40 travels outside of the designated home zone 110, normal air time charges resume.

Accordingly, the purpose of home zone is to provide a pocket of geographic area around the mobile subscriber's home, business, or other designated locations where the mobile subscriber is able to utilize his telecommunications service without incurring expensive air time charges. This obviates the need for the mobile subscriber to switch to a different wireline terminal whenever he is at home or work or to maintain two different bills and/or telephone numbers.

Figure 3:
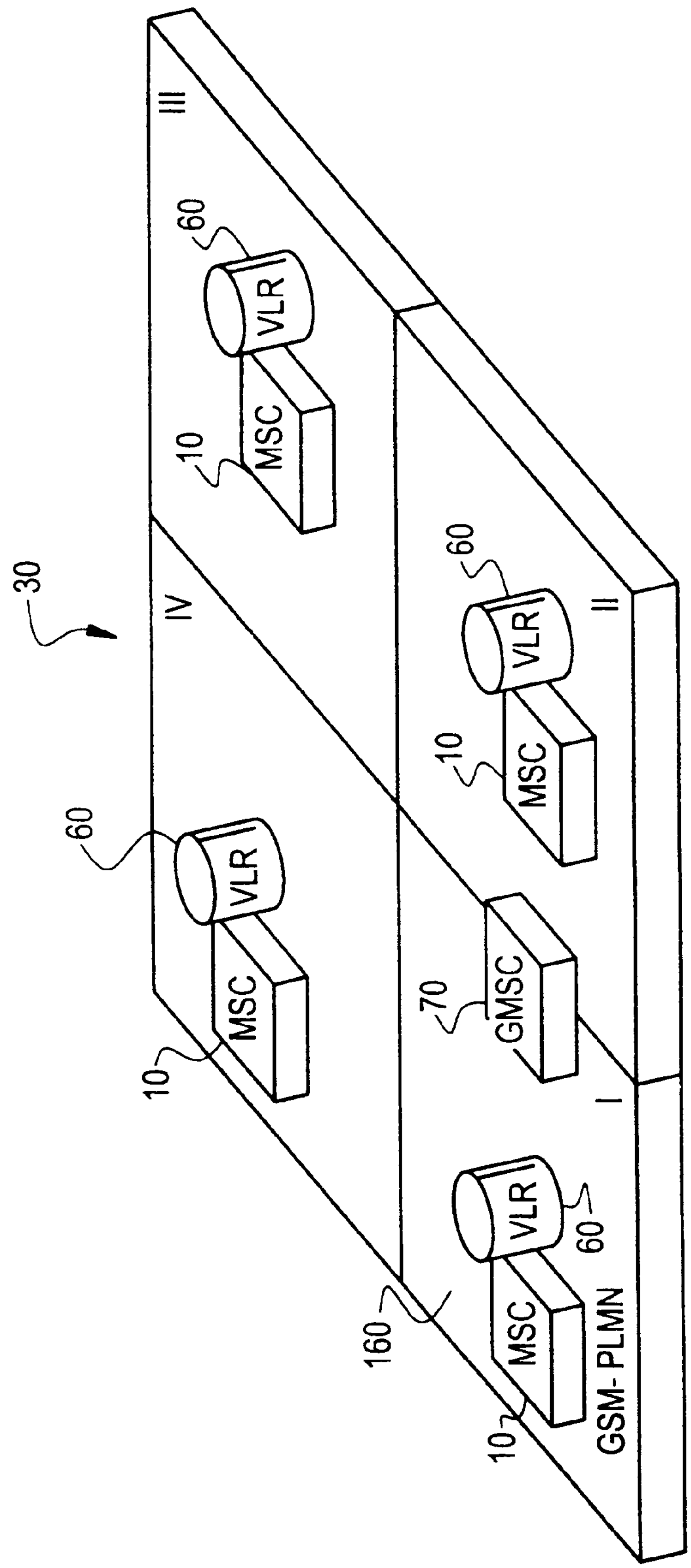
FIG. 3 is a diagram illustrating a single Public Land Mobile Network (PLMN) further comprising multiple Mobile Switching Center (MSC) areas.

Reference is now made to FIG. 3 where a layout of multiple MSC areas 160 within a particular PLMN 30 is illustrated. A PLMN network 30 is a complex configuration comprising multiple MSCs 10, VLRs 60, HLRs (not shown in FIG. 3) Gateway MSC 70 (GMSC), etc. In order to properly switch a call to a mobile station located within a particular PLMN, the correct entities need to be invoked and involved in a call process. As shown in FIG. 3, within each PLMN, there are one or more MSC/VLR areas 160 each being served by an individual MSC/VLR (usually there is a one-to-one relationship between a MSC 10 and its VLR 60 and is often referenced collectively as a MSC/VLR).

Figure 4:
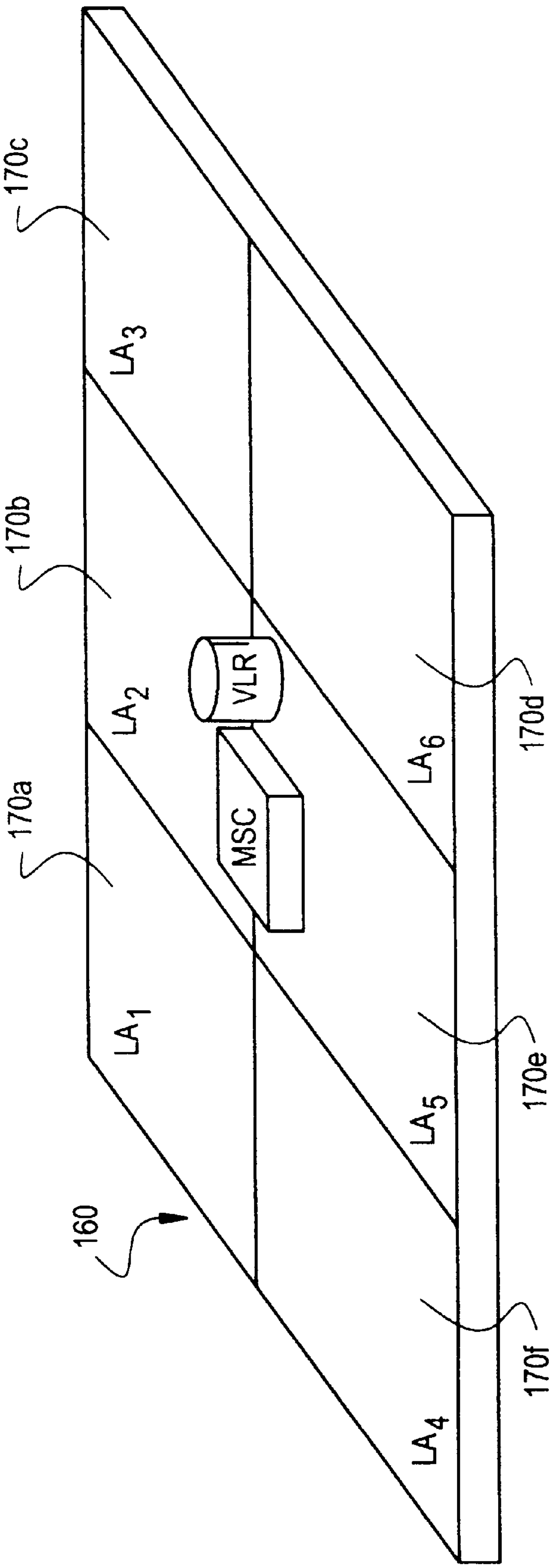
FIG. 4 is a diagram illustrating a single MSC further comprising multiple Location Areas (LAs)

FIG. 4 illustrates multiple Location Areas 170*a*–170*f* within a particular MSC area 160. A Location Area is a part of the MSC service area in which a mobile station may move freely without updating location information to the MSC/VLR serving that Location Area. Therefore, a Location Area is the area where a paging message is broadcast to find the called mobile station. A Location Area Identity (LAI) which identifies each Location Area is used by the mobile network to search for a mobile station which is in an active state.

Figure 5:
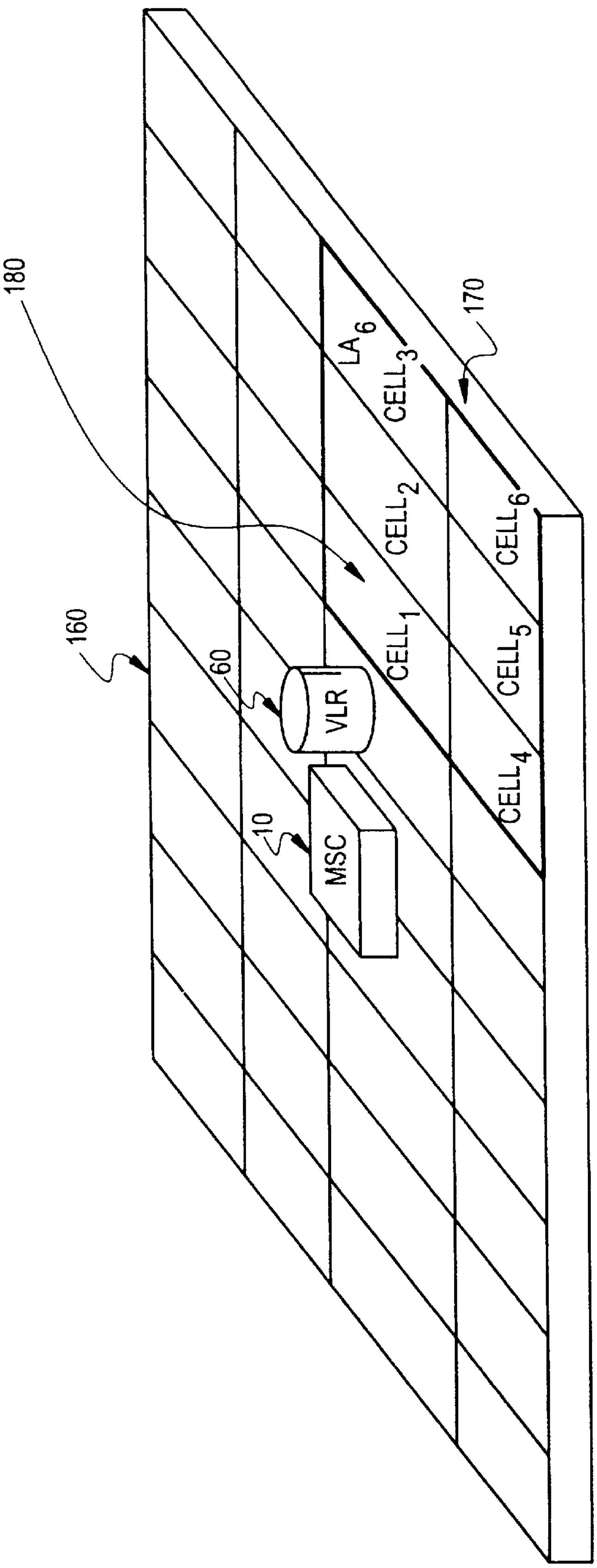
FIG. 5 is a diagram illustrating a single Location Area further comprising multiple Cell Areas.

Referring to FIG. 5, each Location Area 170 within a particular MSC coverage area 160 is further divided into multiple Cell Areas 180. Again, these Cell Areas within the Location Area 180 are served by the same MSC 10 and VLR 60. The serving mobile network identifies a particular radio coverage area known as a Cell Area using a Cell Global Identity (CGI). Different Cell Areas within a single Location Area are distinguished using a Cell Identity and Base Station Identity Code (BSIC) assigned to each serving base station.

Each mobile subscriber can make an agreement with the mobile service provider to designate any one of the above coverage areas to be his home zone. Typically, a cell area covering the mobile subscriber's home or work is designated as the home zone. As a result, as long as the mobile subscriber utilizes his mobile service within his designated cell area, his air time charges will be reduced.

Figure 6:
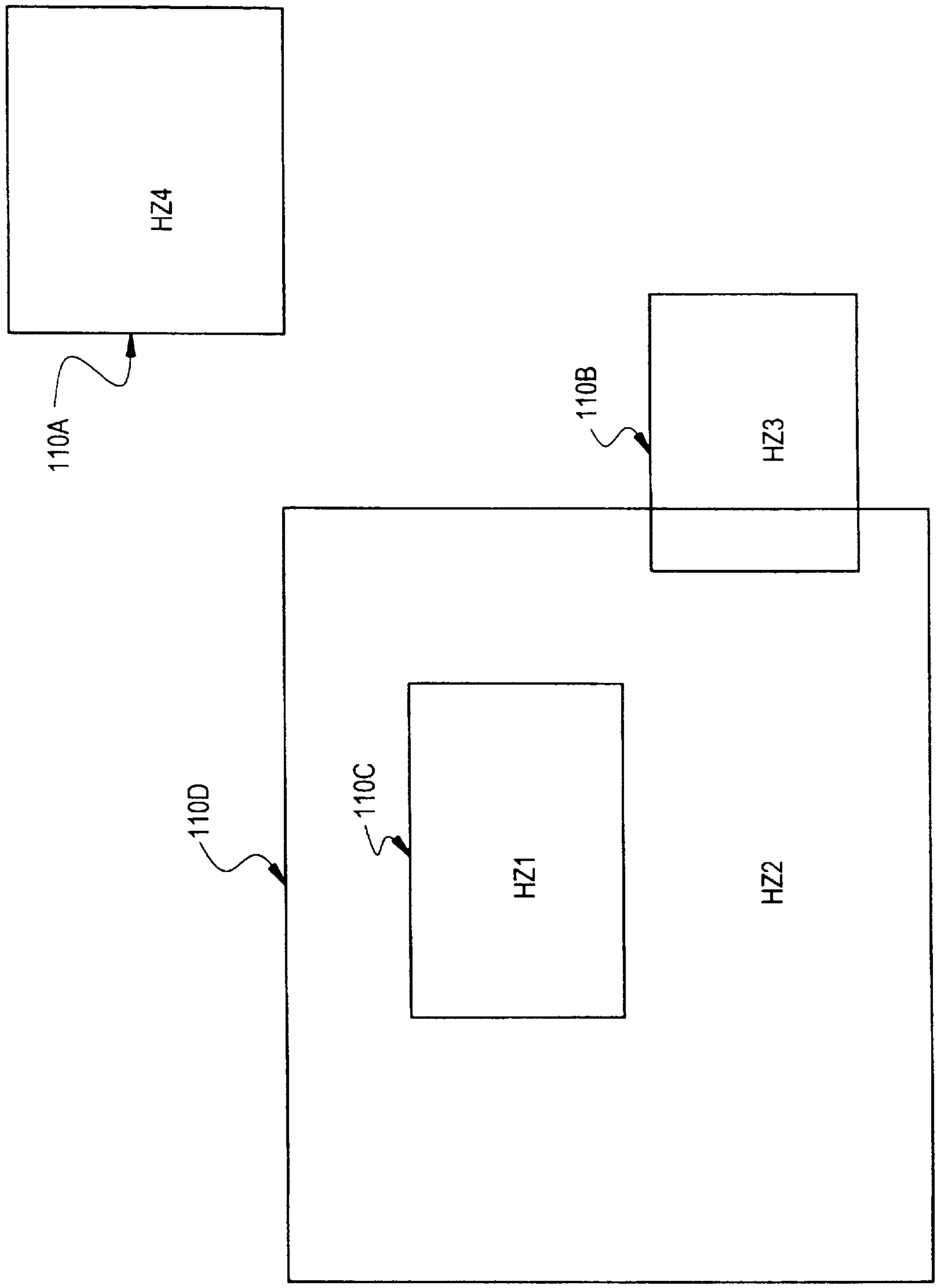
FIG. 6 is a diagram illustrating variable home zones associated with a particular mobile subscriber.

Reference is now made to FIG. 6 illustrating the need for associating multiple home zones with a particular mobile subscriber. Within a conventional mobile telecommunications network, a mobile subscriber is conventionally limited to designating only one home zone per subscription. Accordingly, as his schedule changes, the mobile subscriber needs to inconveniently inform the service provider to provide different home zones.

As an illustration, a typical mobile subscriber is regularly present in a number of different geographic areas in accordance with his schedule. For example, during business hours, the subscriber is typically located within a geographic area covering his work place. As a result, the subscriber would like to designate a home zone 110A covering his work place during that time. On the other hand, after work, the subscriber is located within another geographic area covering his home. Therefore, the subscriber would similarly like to designate a home zone 110C during non-business hours. Furthermore, during weekends, the subscriber might further wish to expand or enlarge his associated home zone to enable the subscriber to utilize his mobile station within a larger geographic area without paying the full air time charges. Accordingly, a larger home zone 110D covering his home might be more desirable during weekends. There might be other days or times within a day where the subscriber might further like to designate a different home zone 110B away from his home or business.

Accordingly, FIG. 7 is a data structure diagram 200 illustrating the association of multiple home zones with a particular mobile subscriber or subscription. Each subscription associated with a particular mobile subscriber is further associated with a register storing data represented as shown in FIG. 7. The representation of the relevant data in relational database format is for exemplary purposes only, and it will be understood that any other types of data structures or data bases can be used to store and to correlate multiple home zones with a particular mobile subscription. Each row or tuple within the data structure represents a separate home zone associated with that particular subscription. Each tuple stores three different types of data: a starting time, ending time, and associated home zone identification. Accordingly, for that time period represented by the starting time and the ending time, the identified home zone is used. Each starting and ending time can be represented via abbreviations and/or numerical values representing a day of the week and/or time of the day. For example, for a first tuple 210, the effective time period is from Monday 8:01 AM to 5:00 PM and uses the home zone identified by home zone ID 0. Similarly, as illustrated by a second tuple 220, for the time period covering Monday 5:01 PM to Tuesday 8:00 AM, another home zone identified by home zone ID 1 is used. For periods not covered by any of the time periods, a default tuple 230 specifying a default home zone is instead used. A register storing such data is then associated within a home location register (not shown in FIG. 7, refer to FIG. 1, HLR 70) serving a particular subscription.

Figure 8:
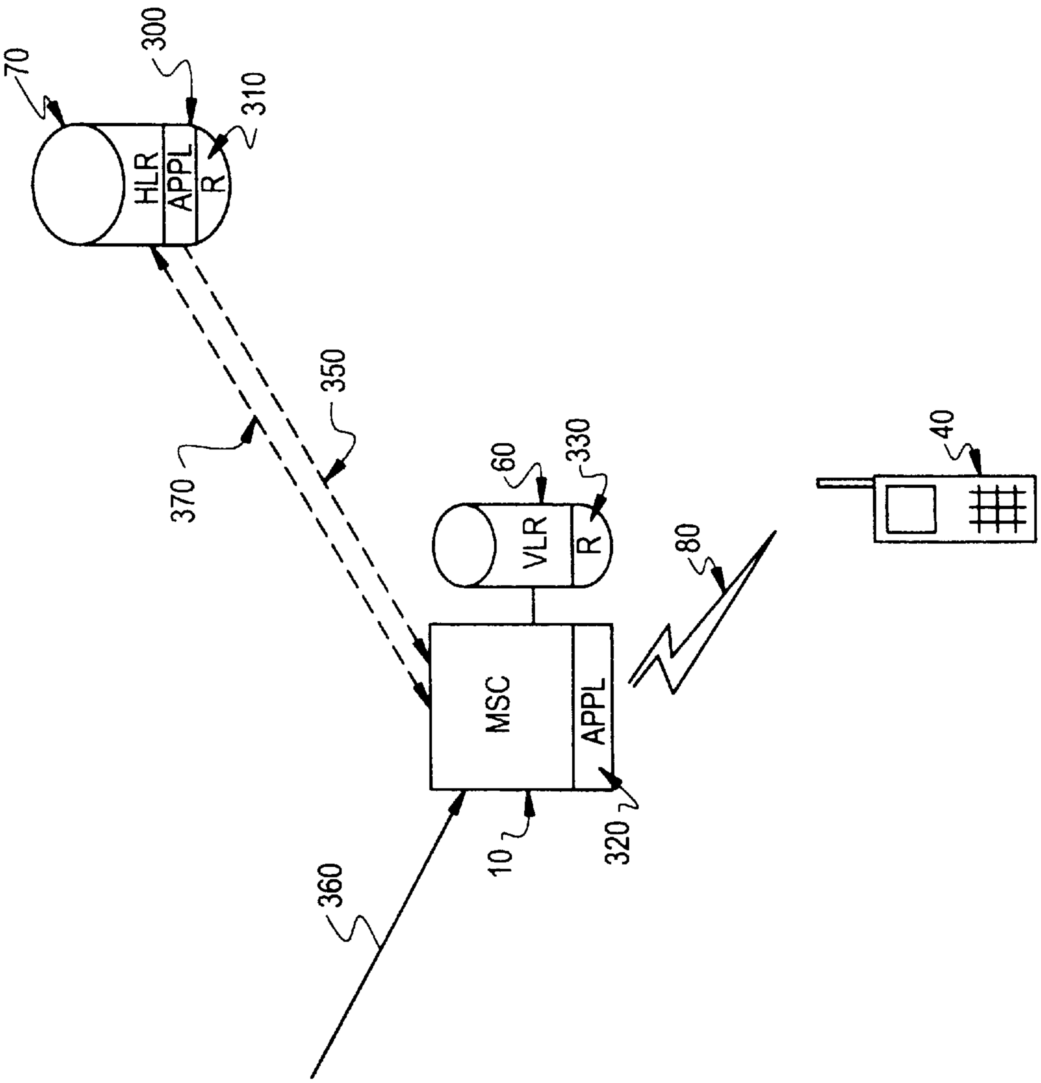
FIG. 8 is a block diagram of a PLMN establishing a call connection with a mobile station located within a variable home zone in accordance with the teachings of the present invention.

Reference is now made to FIG. 8 which is a block diagram of a PLMN establishing a call connection with a mobile station located within a variable home zone in accordance with the teachings of the present invention. A register 310 storing data as fully described in FIG. 7 is associated with an HLR 70 serving a particular mobile subscription. Whenever a mobile station 40 associated with the subscription travels into a coverage area being served by a particular MSC 10, the serving MSC 10 performs a location update with the associated HLR 70 to inform the HLR of the mobile station's new location and the identity of the serving MSC. An application module 300 associated with the HLR 70 then evaluates the time period specified by each tuple or record, and determines which home zone is currently effective for the mobile station 40. After making such a determination, data representing the currently effective home zone are then down-loaded or communicated to the serving MSC 10 via a signal 350. The signal 350 includes a Signaling Connection Control Part (SCCP) based signals, such as Transaction Capability Application Part (TCAP), Mobile Application Part (MAP), or any other connection-less packet signals. An application module 320 associated with the serving MSC 10 then receives the communicated data and stores the data representing the currently effective home zone for that mobile station to a register 330 associated with the VLR 60.

For outgoing call connections, the mobile station 40 then transmits a call setup signal, such as a Direct Transfer Application Part (DTAP) based signal, to the serving MSC 10. The transmitted DTAP signal further includes data identifying the cell currently serving the mobile station. The application module 320 then determines whether the cell currently covering the mobile station 40 is one of the cell areas associated with the specified home zone. If the mobile station is located within the effective home zone, the serving MSC establishes a call connection 80 with an indicated calling party number at a reduced rate. On the other hand, if the mobile station is located outside of the effective home zone, a normal air-time rate is instead applied. Furthermore, as another embodiment of the present invention, an indication is generated towards the mobile station to inform the associated mobile subscriber of the applied charging rate. Such an indication includes generating a predetermined tone over the radio connection 80, playing an announcement message before setting up a call, displaying a message on the display unit attached to the mobile station 40, or transmitting a unstructured data, such as a Short Message Service signal, over a control channel to the mobile station 40.

For incoming call connections, the serving MSC 10 receives a call setup signal 360, such as an Initial Address Message (IAM), towards the mobile station over the connected telecommunications network. The serving MSC 10 then pages the mobile station 40 within the lastly registered location area. The mobile station 40 then responses to the paging by identifying the current cell area covering the mobile station. As a result, the radio connection 80 is established between the mobile station 40 and the serving MSC 10. In a similar manner, the application module 320 then determines whether the mobile station is currently located within the effective home zone and applies an applicable charging rate.

Thereafter, the application module 300 associated with the HLR continuously evaluates the associated time periods stored at the register 310, and due to time changes, if a new home zone becomes effective for the mobile station 40, the application module 300 again down-loads or communicates data representing the new home zone to the serving MSC 10. The application module 320 associated with the serving MSC 10 then stores the received data at the register 330 and similarly utilizes the new data to determine whether the mobile station should be charged at a lower rate for subsequent call connections.

As another embodiment of the present invention, instead of down-loading or communicating home zone data from the serving HLR 70 to the serving MSC 10, the serving MSC 10 queries the HLR 70 for each call connection requested with the mobile station 40. Accordingly, either an incoming call connection or outgoing call connection request is received by the serving MSC 10 for the mobile station 40. The application module 320 then transmits a connection-less signal 370, such as a TCAP or MAP based signal, to the HLR 70 associated with the mobile station 40. The transmitted signal 370 requests data representing the home zone currently effective for the mobile station 40. In response, the application module 300 determines the home zone that is currently effective for the mobile station 40 and communicates such data back to the serving MSC 10. The serving MSC 10 then determines whether the mobile station is currently located within the specified home zone in a similar manner as described above.

As another embodiment of the present invention, the serving MSC may further include data representing the cell area currently serving the mobile station within the transmitted connection-less signal 370 to the HLR 70. The application module 300 associated with the HLR 70 then makes the determination and informs the serving MSC 10 whether the specified cell area is one of the cell areas associated with the currently effective home zone. Utilizing such a response, the serving MSC 10 may then inform the mobile station of its charging status.

Due to its different sizes and locality, each home zone is further associated with a different charging rate. For a smaller home zone covering the place of work, a lower charging rate may be applied. For a larger geographic area or high traffic capacity area, a higher charging rate can be accordingly assigned. An increase in feature subscription fees can further be levied for an increase in the number of home zones associated with a particular subscription. For calculating fees for the particular subscription, a centralized billing center can then utilize the associated billing rates for different home zones utilized by the mobile subscriber.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for charging a subscription for a mobile call connection within a mobile telecommunications network, said method comprising the steps of:

receiving an indication to establish a call connection with a particular mobile station associated with said subscription;

determining which one of a plurality of particular reduced charging areas selected by a subscriber, each charging area having an effective time period and associated with said subscriber's subscription, is in effect at the current time of said call connection;

determining whether said mobile station is currently within said determined in effect reduced charging area; and if yes, using a first charging area rate for said call connection;

otherwise, using a second charging rate for said call connection.

2. The method of claim 1 wherein said step of determining said particular reduced charging area further comprises the step of receiving data indicating said particular charging area from a home location register (HLR) associated with said subscription by a mobile switching center (MSC) currently serving said mobile station.

3. The method of claim 2 wherein said step of receiving said data further comprises the step of said MSC requesting and receiving said data from said HLR after receiving an indication to establish a call connection with said mobile station.

4. The method of claim 2 wherein said step of receiving said data further comprises the step of periodically receiving data representing an applicable reduced charging area from said HLR as said reduced charging area associated with said subscription changes with time.

5. The method of claim 2 wherein said data are received using a Mobile Application Part (MAP) based signal.

6. The method of claim 1 wherein said time associated with said call connection includes a time of the day.

7. The method of claim 1 wherein said time associated with said call connection includes a day of the week.

8. The method of claim 1 further comprises the step of informing said mobile station of said charging rate.

9. A method for determining a charging rate for a call connection with a mobile station within a mobile telecommunications network, said method comprising the steps of:

associating a plurality of reduced charging areas with a mobile subscription, each of said plurality of reduced charging areas having a different effective time period and each reduced charging area individually tailored to a user having the mobile subscription;

receiving an indication to establish a call connection with a mobile station associated with said mobile subscription;

determining that one of said plurality of reduced charging areas is currently effective for said mobile station;

determining that said mobile station is located within said determined effective one of said plurality of reduced charging areas; and charging a subscription associated with said mobile station at a reduced rate for said call connection.

10. The method of claim 9 wherein said step of associating said plurality of reduced charging areas is performed within a home location register (HLR) associated with said subscription.

11. The method of claim 9 wherein said step of associating said plurality of reduced charging areas further comprises the step of associating a separate charging rate for each of said plurality of reduced charging areas.

12. The method of claim 9 wherein said determined one of said plurality of reduced charging areas is associated with one or more cell areas and wherein said step of determining that said mobile station is located within said determined one of said plurality of reduced charging areas further comprises the steps of:

determining a cell area currently serving said mobile station; and determining whether said determined cell area is one of said cell areas associated with said determined reduced charging area.

13. The method of claim 9 wherein said step of determining that one of said plurality of reduced charging areas is currently effective further comprises the step of requesting data representing said reduced charging area that is currently effective from a home location register (HLR) associated with said subscription by a mobile switching center (MSC) currently serving said mobile station in response to said received indication.

14. The method of claim 9 wherein said step of determining that one of said plurality of reduced charging areas is currently effective further comprises the step of receiving data representing said reduced charging area as said time period associated with said reduced charging area becomes effective, said data received at a mobile switching center (MSC) serving said mobile station from a home location register (HLR) associated with said subscription.

15. The method of claim 9 further comprises the step of informing said mobile station whether said mobile station is within said determined reduced charging area.

16. A system for determining a charging rate for a call connection with a mobile station within a mobile telecommunications network, comprising:

a register for storing data associating a plurality of reduced charging areas with a subscription, each of said plurality of reduced charging areas further having a different time period specifying when reducing charging within said reduced charging area is effective and each reduced charging area being individually tailored to a user having the subscription; and a telecommunications switch for receiving an indication to establish a call connection with a mobile station associated with said subscription, said telecommunications switch associated with said register and further comprising:

means for determining that one of said plurality of reduced charging areas is currently effective for said mobile station;

means for determining that said mobile station is located within said determined effective reduced charging area; and means for charging said subscription associated with said mobile station with a reduced charge for said call connection.

17. The system of claim 16 wherein each of said plurality of reducing charging areas is associated with a corresponding charging rate.

18. The system of claim 16 wherein said register is a home location register (HLR) associated with said subscription and said telecommunications node further comprises means for receiving said data from said HLR.

19. The system of claim 18 wherein said means for receiving said data from said HLR requests and receives said data representing said reduced charging area currently effective in response to said received indication.

20. The system of claim 16 wherein said telecommunications node comprises a mobile switching center (MSC) currently serving said mobile station.

21. A telecommunications node for storing subscription data associated with a particular subscription, comprising:

means for storing data associating a plurality of reduced charging areas with a subscription, each of said plurality of reduced charging areas having a corresponding different time period specifying when reduced charging within said reduced charging area is effective for said subscription and each reduced charging area being individually tailored to a user having the subscription; and means for determining which one of said plurality of reduced charging areas is currently effective for said subscription so that the subscription may be charged at a reduced rate for a call connection with a mobile station associated with the subscription if that mobile station is located within the determined effective one of said reduced charging areas.

22. The telecommunications node of claim 21 wherein said means are associated with a home location register (HLR) serving said subscription.

23. The telecommunications node of claim 21 further comprising means for associating a different charging rate for each of said plurality of reduced charging areas.

* * * * *